Dec. 22, 1953     L. E. SAUER     2,663,828
REACTOR
Filed Nov. 7, 1951     4 Sheets-Sheet 1

WITNESSES: Robert C. Baird, K. H. Thomas

INVENTOR
Louis E. Sauer.
BY Ezra W. Savage
ATTORNEY

Dec. 22, 1953    L. E. SAUER    2,663,828
REACTOR

Filed Nov. 7, 1951    4 Sheets-Sheet 2

WITNESSES:
Robert C. Baird
K. W. Thomas

INVENTOR
Louis E. Sauer.
BY
Ezra W. Savage
ATTORNEY

Dec. 22, 1953  L. E. SAUER  2,663,828
REACTOR
Filed Nov. 7, 1951  4 Sheets-Sheet 4

WITNESSES:
Robert C. Baird
K. W. Thomas

INVENTOR
Louis E. Sauer.
BY Ezra W. Savage
ATTORNEY

Patented Dec. 22, 1953

2,663,828

UNITED STATES PATENT OFFICE 2,663,828

REACTOR

Louis E. Sauer, Sharon, Pa., assignor to Westinghouse Electric Corporation, East Pittsburgh, Pa., a corporation of Pennsylvania Application November 7, 1951, Serial No. 255,189

5 Claims. (Cl. 317—220)

This invention relates to current limiting reactors and in particular to reinforced current limiting reactors.

When utilizing a T or Pi type current limiting reactor in which the reactor comprises more than one coil section, a problem arises which does not exist when utilizing a reactor comprising a single coil section. For instance, where each coil section of the reactor is associated with a branch feeder and faults occur simultaneously on each of the branch feeders associated with the respective coil sections, a high magnetic repulsive force is established between two of the coil sections. If the coils are of large diameter and are carrying current of large magnitude, the repulsive force will be such as to effect a complete physical separation of the coil sections.

Heretofore various methods have been used to prevent the separation of the coil sections when such repulsive forces of large magnitude are encountered, such as expensive clamping means for holding the coil sections in assembled operative relation. These prior art clamping means increased the cost and size of the reactor. Further such clamping means failed to hold the coil sections rigidly in place when a high repulsive force is established therebetween and thus, although the reactor is not completely put out of service, considerable damage is inflicted on the reactor. It is, therefore, desirable to provide some means for preventing the separation of the coil sections which would be inexpensive and would not add to the size of the reactor.

An object of this invention is to provide a current limiting reactor having the coil sections thereof so secured as to prevent the physical separation of the coil sections when subjected to the forces encountered in use.

A further object of this invention is to provide, in a current limiting reactor having a pair of coil sections, for securing predetermined corresponding turns of the coil sections, the securing means progressively decreasing in strength from the adjacent corresponding turns of the coil sections to the farthest separated of the predetermined corresponding turns.

A still further object of this invention is to provide distributed tape means for so securing the coil sections of a current limiting reactor that the coil sections are prevented from physically separating when a high magnetic repulsive force is established therebetween.

Other objects of this invention will become apparent from the following description when taken in conjunction with the accompanying drawing, in which.

Figure 1:
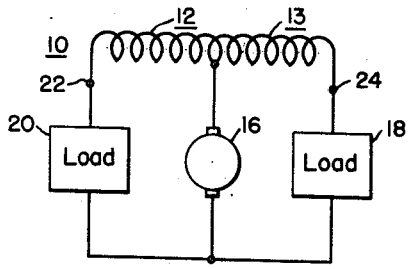
Figure 1 is a schematic diagram of circuits and apparatus embodying a T type current limiting reactor.

Referring to Figure 1 of the drawing, there is schematically illustrated a T type current limiting reactor 10 comprising two coil sections 12 and 13, respectively. The coil sections 12 and 13 are disposed to limit the flow of current from an alternating current generator 16 to two loads 18 and 20. Thus, one terminal of the generator 16 is electrically connected to the common junction point of the coil sections 12 and 13, and the other terminal is connected to the loads 18 and 20, and from thence to the ends of the coil sections 13 and 12, respectively.

When faults occur simultaneously at the points 22 and 24, fault current flows from the generator 16 in a direction towards the two faults. The fault current flowing through the coil sections 12 and 13, if of sufficient magnitude, effects a high magnetic repulsive force between the coil sections 12 and 13, which is often of sufficient magnitude to cause a physical separation of the coil sections 12 and 13, and thereby permanently damage the current limiting reactor 10, unless the coil sections are secured together as will be described hereinafter.

Figure 2:
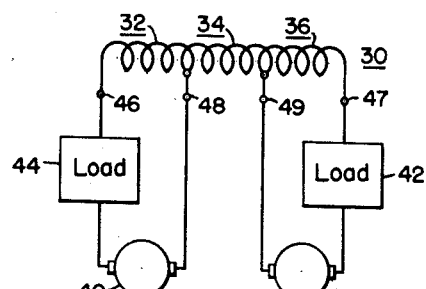
Figure 2 is a schematic diagram of circuits and apparatus embodying a Pi type current limiting reactor.

Figure 2 illustrates a Pi type current limiting reactor 30 which likewise must be provided with some means for preventing damage to the assembly of its coil sections, should a plurality of simultaneous faults occur or should separate faults occur at particular points as will be discussed more fully hereinafter. In this instance the current limiting reactor 30 comprises three coil sections, 32, 34 and 36, the coil sections 36 and 32 being disposed to limit the current flow from alternating current generators 38 and 40, respectively. One terminal of the generator 38 is connected to the junction point of the coil sections 34 and 36, and through the coil section 36 to one side of a load 42, the other terminal on the other side of the generator 38 being connected to the other side of the load 42. Likewise, a terminal of the generator 40 is connected to the junction point of the coil sections 32 and 34, and through the coil section 32 to one side of a load 44, the other terminal of the generator 40 being connected to the other side of the load 44.

When faults occur simultaneously at the points 46 and 47, fault current flows from the alternating current generators 38 and 40 towards the faults so as to produce a magnetic repulsive force between the coil sections 36 and 32. If the repulsive force is of sufficient magnitude, it will effect a physical separation of the coil sections 32 and 36, thus permanently damaging the current limiting reactor 30, unless the coil sections 32 and 36 are secured together as will be described hereinafter.

On the other hand, if a single fault occurs at the point 48, fault current flows from the generators 38 and 40 towards the single fault and thus produces a magnetic repulsive force between the coil sections 32 and 34. However, if a single fault occurs at the point 49, fault current flows towards this latter fault from the generators 38 and 40 and establishes a magnetic repulsive force between the coil sections 34 and 36. If these repulsive forces are of sufficient magnitude, they will effect a physical separation of the coil sections 32—34 or 34—36, depending upon the location of the fault, unless these coil sections are properly secured as will be described hereinafter.

Figure 3:
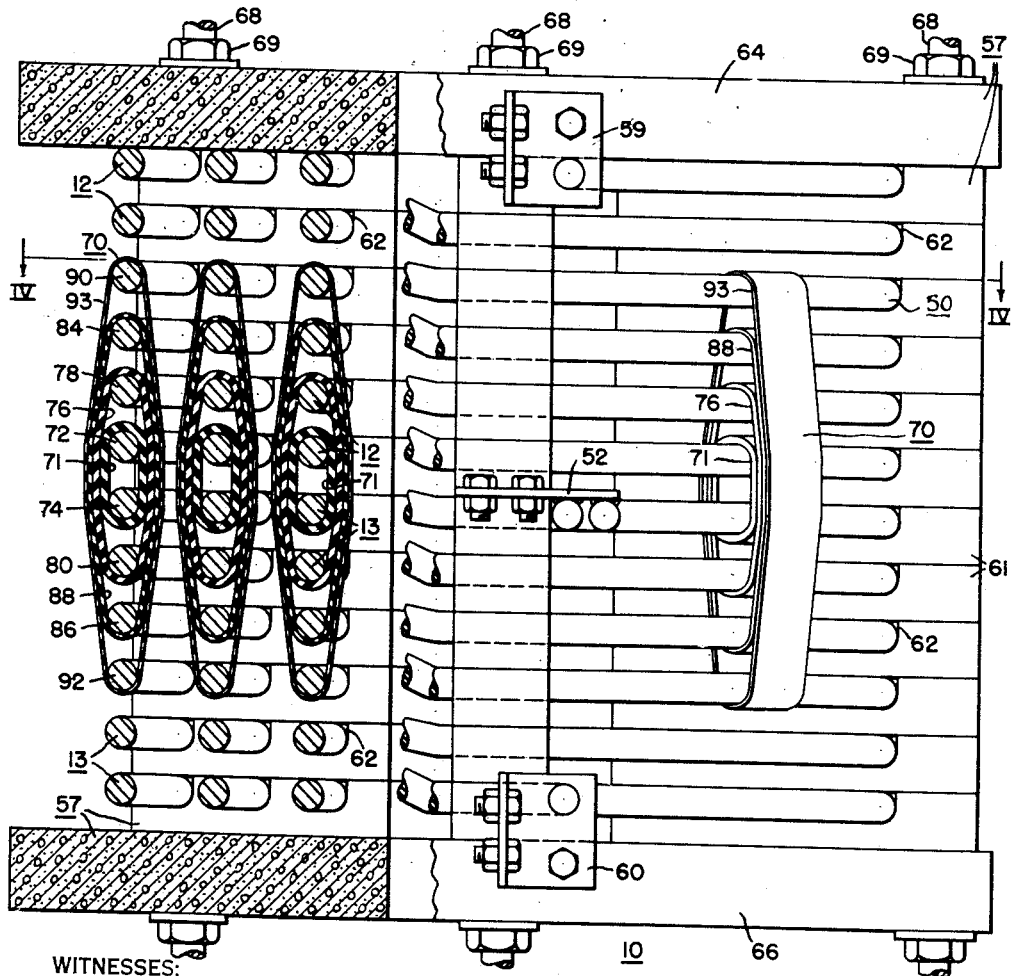
Figure 3 is a view partly in section and partly in elevation taken along the lines III—III of Fig. 4 illustrating a reactor comprising an embodiment of the teachings of this invention.

Referring to Figure 3, there is illustrated in detail the T type current limiting reactor 10 of Figure 1, which comprises an embodiment of the teachings of this invention. In this embodiment, the reactor 10 comprises a horizontally wound coil 50, which is suitably connected at its midpoint to a terminal 52, so as to form the upper coil section 12 and the lower coil section 13. However, it is to be understood that the present invention is equally applicable to the Pi-type current limiting reactor 30 as illustrated in Figure 2 and when so applied, constitutes other embodiments of this invention.

The reactor 10 comprises essentially the coil sections 12 and 13 and a supporting means 57 for normally holding the coil sections 12 and 13 in horizontal and vertical spaced relation when the current limiting reactor 10 does not have fault current flowing simultaneously through the sections 12 and 13. In order to provide means for readily connecting the reactor 10 into an electrical circuit, the upper end of the coil section 12 is provided with a stationary terminal 59, which is suitably mounted on the side of the reactor 10. In like manner, the lower end of the coil section 13 is provided with a stationary terminal 60, which is likewise suitably mounted on the side of the reactor 10. The center terminal 52 is also mounted on the side of the reactor 10.

As was hereinbefore mentioned, the supporting means 57 is provided in order to hold the coil sections 12 and 13 in horizontal and vertical spaced relation when fault current does not flow simultaneously through the coil sections 12 and 13. The supporting means 57 comprises a plurality of layers of cleat members 61, formed from an insulating material, and disposed to hold the layers of coil turns in horizontal spaced relation.

Figure 4:
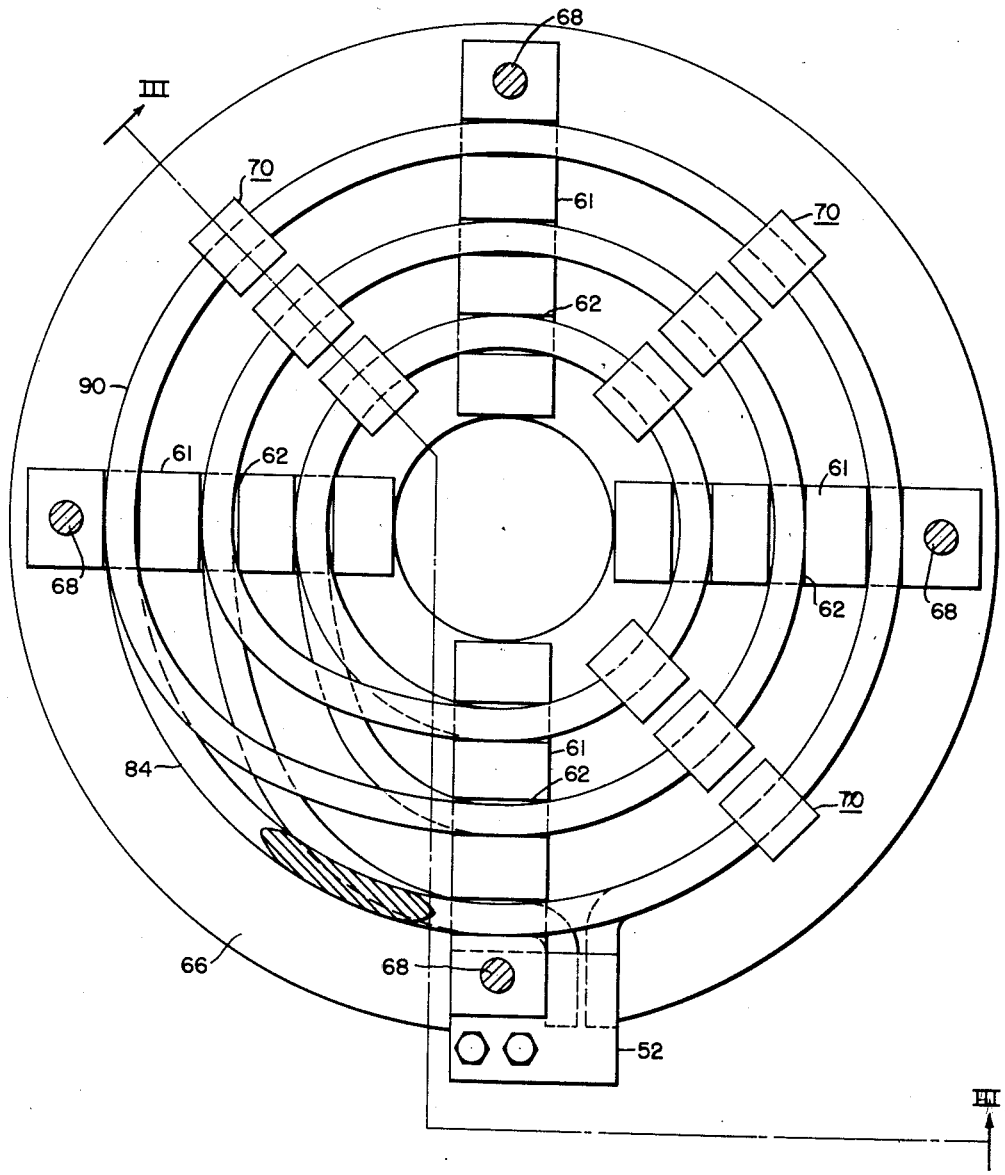
Figure 4 is a view in section taken along the lines IV—IV of Figure 3.

Each layer of cleat members 61 is formed of four radially spaced cleat members 61 spaced 90 degrees apart, as can more clearly be seen in Fig. 4. The cleat members 61 of each layer are vertically aligned with the corresponding cleat members of the adjacent layers. Also, in order to properly hold in place the turns forming the different layers of the coil sections 12 and 13, each cleat member 61 is provided with a plurality of spaced channels 62 for receiving the turns of the coil sections 12 and 13.

It is to be noted that the coil section 12 is disposed in the channels 62 of the upper 24 cleats of the reactor 10 by spirally winding it inwardly along the first layer of cleat members 61 and then spirally winding it outwardly along the second from the top layer of cleat members 61 and in like manner along the remaining four upper layers of cleat members 61, so as to form three vertical rows of spaced coil turns. The coil section 13 is disposed in the lower six layers of cleat members 61 by spirally winding it inwardly along the uppermost layer of the lower six layers of radially spaced cleat members 61, and then outwardly along the next lower layer of cleat members 61, and in like manner along the remaining four lower layers of cleat members 61, to form a continuation of the three vertical rows of coil turns of the upper coil section 12.

As illustrated, a top disk member 64 and a bottom disk member 66, both formed of an insulating material, such as reinforced concrete, are disposed on opposite ends of the assembled cleat members 61 which have the coil sections 12 and 13 disposed therebetween as described hereinbefore. In order to hold the top disk member 64, the cleat members 61, the coil sections 12 and 13, and the bottom disk member 66 in assembled relation, spaced tie rods 68 and associated nuts 69 are provided, the tie rods 68 extending through the assembled components.

In order to prevent the physical separation of the coil sections 12 and 13 when a magnetic repulsive force of large magnitude exists between the coil sections 12 and 13, tape means 70 is provided. The tape means 70 may be formed of either a tape made from glass fibers, a linen tape impregnated with varnish, a tape made from fibers of linear polyacrylonitrile polymer, or any suitable insulating material which has substantially no yield when subjected to a high tensile force.

As illustrated, the tape means 70 comprises a number of turns of tape associated with a predetermined number of the layers of the coil turns that comprise the coil sections 12 and 13. In particular, a plurality of turns 71 of tape are disposed around the outer coil turns 72 and 74 of the innermost layers of the coil sections 12 and 13. Likewise, similar turns 71 of tape are disposed about the other corresponding turns of the innermost layers of the coil sections 12 and 13. These turns of tape are effective for preventing a physical separation of the coil turns of the innermost layers of the coil sections 12 and 13, should a high magnetic repulsive force be established therebetween. Such turns of tape are intermediate each pair of the radially spaced cleat members 61, as can more clearly be seen in Fig. 4. However, since, for the purpose of clarity of the drawing, the coil turns shown in Fig. 4 are illustrated as being abruptly bent in one quadrature of the reactor in spirally winding the coil turns into the channels 62, the tape means 70 has not been shown in this quadrature. In practice, these bends would not be so pronounced and tape means 70 would also be disposed thereon.

In order to prevent the turns 71 of tape from unraveling, the ends thereof are suitably secured such as by adhering them to the turns 71 of tape by means of an adhesive. The ends of the turns of tape hereinafter referred to are secured in like manner. It is also to be understood that any suitable flexible tieing means that is composed of an insulating material and has substantially no yield when under high tensile force could be used in place of the turns 71 of tape or in place of the other turns of tape hereinafter referred to.

As can be seen from the drawing, the number of turns 71 of tape disposed around the coil turns 72 and 74 of the innermost layers is greater in number than turns 76 of tape disposed around coil turns 78 and 80 of the next layers that appear above and below the coil turns 72 and 74, respectively. The reason for this is that the magnetic repulsive force is greater between the coil turns 72 and 74 than it is between the coil turns 78 and 80 for a given condition. Since the magnetic repulsive force is even smaller for the given condition between coil turns 84 and 86 of the following layers, a still fewer number of turns 88 of tape are disposed around the coil turns 84 and 86. The repulsive force between corresponding coil turns 90 and 92 is still smaller than the repulsive force that exists between the coil turns 84 and 86 for the given condition. Therefore, fewer turns 93 of tape are disposed around the coil turns 90 and 92 than are disposed around the coil turns 84 and 86.

Although the tape means 70 has only been described as being disposed around the corresponding coil turns 72—74, 78—80, 84—86, and 90—92, of the upper and lower coil sections 12 and 13, tape is disposed in like manner, as shown in Figures 3 and 4, around the corresponding coil turns that are disposed inwardly of the coil turns 72—74, 78—80, 84—86 and 90—92.

As illustrated in the drawing, turns of tape are not disposed around the upper and lower two layers of coil turns of the coil sections 12 and 13, respectively, since the magnetic force that exists therebetween for the given condition is attractive rather than repulsive. It is to be understood, however, that the number of layers of coil turns that do not have tape disposed thereon depends on many factors such as the rating of the reactor and the number of coil turns disposed thereon.

Figure 5:
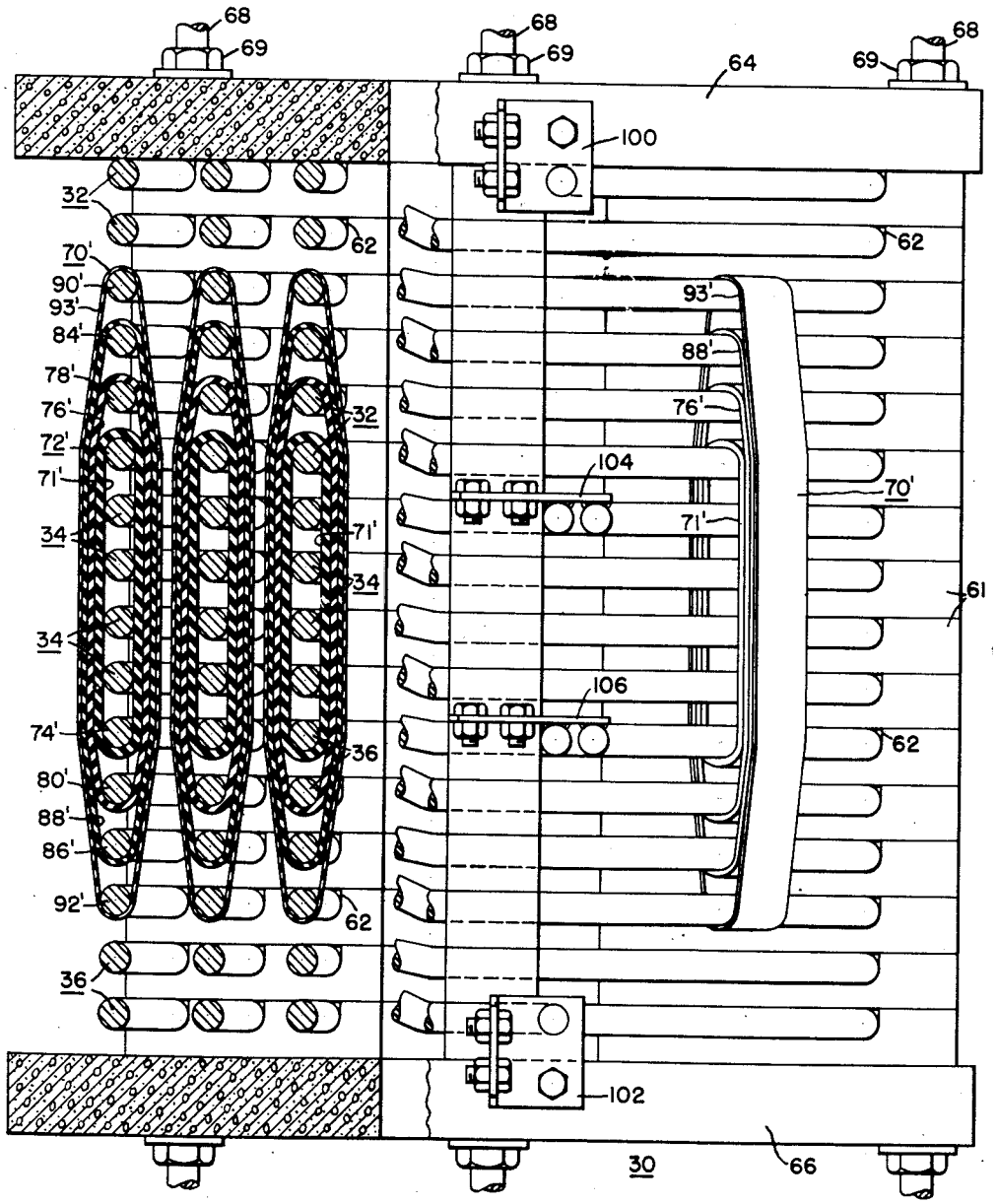
Figure 5 is a view partly in section and partly in elevation, corresponding to the view shown in Fig. 3, illustrating a reactor comprising another embodiment of the teachings of this invention.

Referring to Fig. 5, there is illustrated another embodiment of the teachings of this invention. In this embodiment, the present invention is applied to the Pi type reactor 30 of Fig. 2, so as to prevent the physical separation of the coil sections 32 and 36 should simultaneous faults occur at the points 46 and 47. In order to simplify the description of the reactor 30, primed reference characters corresponding to the reference characters of Fig. 3 are used to identify components corresponding to like components of the embodiment shown in Fig. 3. For instance, the various coil turns and turns of tape are given primed reference characters since they have substantially the same function and cooperation with one another as the like components in the embodiment of the reactor 10, shown in Fig. 3. In this instance, however, the turns 71', 76', 88' and 93' of tape are much longer than the corresponding turns 71, 76, 88 and 93 of tape shown in Fig. 3, since they must be long enough so as to extend across the coil section 34 in the vertical direction.

As can be seen from the drawing, the reactor 30 of Fig. 5 comprises the coil sections 32, 34 and 36, the centrally positioned coil section 34 comprising four layers of coil turns having no turns of tape disposed thereon since when fault current flows through the coil sections 32 and 36 when faults occur simultaneously at the points 46 and 47 substantially no current flows through the coil section 34. Thus, there is substantially no magnetic force set up between the coil section 34 and the end coil sections 32 and 36 when such a condition exists, therefore rendering it unnecessary to provide means for preventing the physical separation of the intermediate coil section 34 from the end coil sections 32 and 36. Although the coil turns of the coil section 34 have no tape associated therewith, they are disposed in the channels 62 of the cleat members 61, as are the coil turns of the other coil sections.

In order to provide means for readily connecting the reactor 30 into an electrical circuit, the upper end of the coil section 32 is provided with a stationary terminal 100 which is mounted on the side of the reactor 30. In like manner, the lower end of the coil section 36 is provided with a stationary terminal 102 which is likewise suitably mounted on the side of the reactor 30. A terminal 104 is suitably connected to the junction point of the coil sections 32 and 34 and a terminal 106 is suitably connected to the junction point of the coil sections 34 and 36, the terminals 104 and 106 being suitably mounted on the side of the reactor 30.

Figure 6:
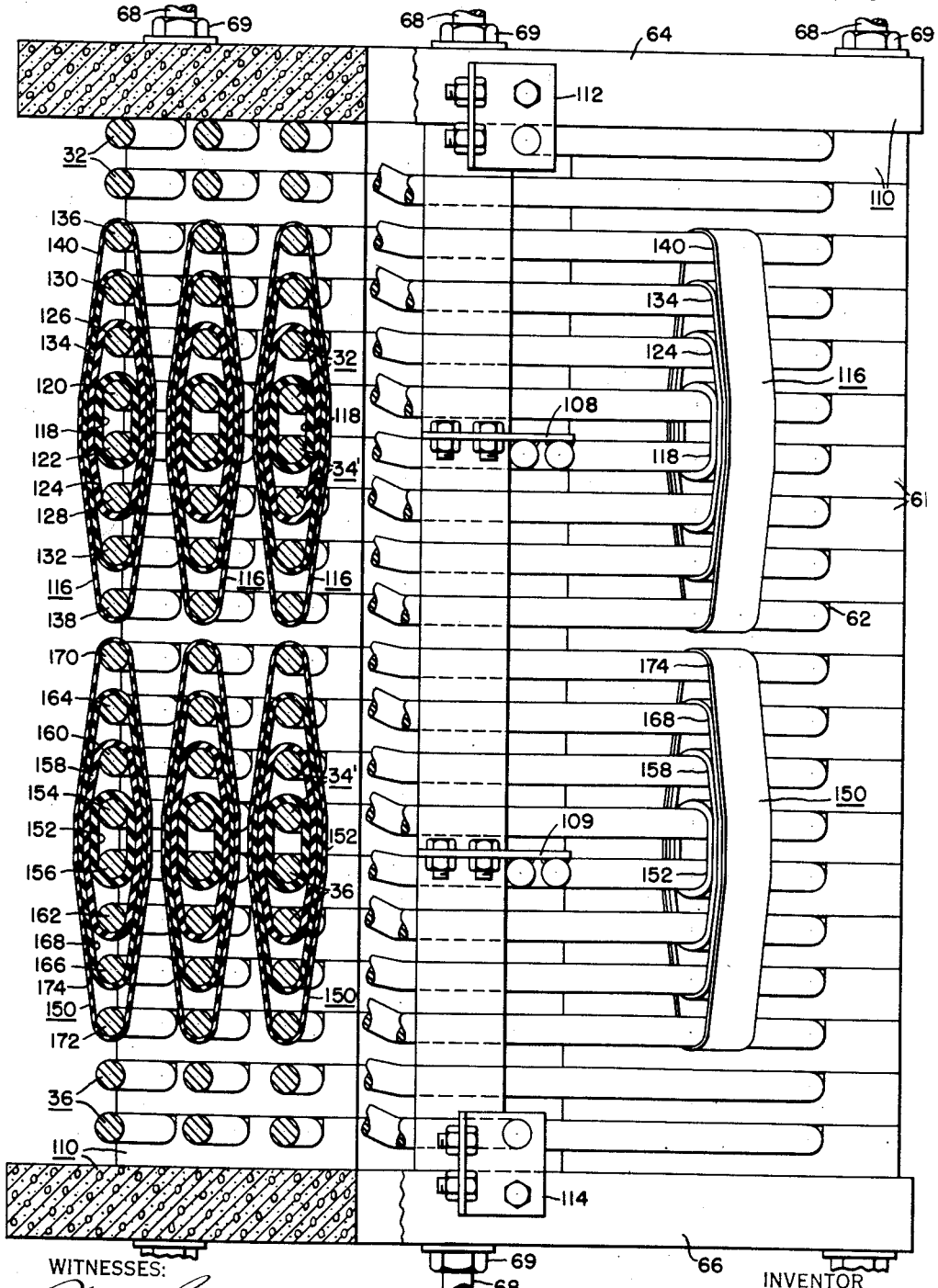
Figure 6 is a view partly in section and partly in elevation, corresponding to the view shown in Fig. 3, illustrating a reactor comprising still another embodiment of the teachings of this invention.

Referring to Fig. 6, there is illustrated still another embodiment of the teachings of this invention. In this embodiment the present invention is applied to the Pi type reactor 30 of Fig. 2, so as to prevent the physical separation of the coil sections 32—34 or 34—36, should faults occur at the points 48 or 49, respectively. In order to simplify the description of the reactor 30, identical reference characters are used to identify components corresponding to like components of the embodiment shown in Fig. 5.

In the embodiment shown in Fig. 6, the reactor 30 comprises essentially the coil sections 32, 34', and 36, which are suitably connected at the junction point of the sections 32 and 34' and the junction point of the sections 34' and 36 to terminals 108 and 109, respectively. Supporting means 110 is provided for normally holding the coil sections 32, 34' and 36 in horizontal and vertical spaced relation with respect to one another when the current limiting reactor 30 does not have fault current flowing therethrough. In order to provide means for readily connecting the reactor 30 into an electrical circuit, the upper end of the coil section 32 is provided with a stationary terminal 112, which is suitably mounted on the side of the reactor 30. In like manner, the lower end of the coil section 36 is provided with a stationary terminal 114, which is likewise suitably mounted on the side of the reactor 30. The terminals 108 and 109 are also mounted on the side of the reactor 30, and are electrically connected to the upper and lower end, respectively, of the coil section 34'.

In this instance, the upper coil section 32 comprises six layers of coil turns which are disposed in the uppermost six layers of cleat members 61. On the other hand, the intermediate coil section 34' comprises eight layers of coil turns which are disposed in the following eight layers of cleat members 61; whereas the lower coil section 36 comprises six layers of coil turns which are disposed in the lowermost six layers of cleat members 61. As in the previously described embodiments, each layer of the cleat members 61 is formed of four radially spaced cleat members 61 spaced 90 degrees apart, and the individual cleat members 61 of each layer are vertically aligned with the corresponding cleat members of the adjacent layers.

In this embodiment, a plurality of tape means 116, similar to the tape means 70 of Fig. 3, is applied to predetermined coil turns of the sections 32 and 34. The tape means 116 comprises a number of turns 118, 124, 134 and 140 of tape associated with a predetermined number of layers of the coil turns that comprise the coil sections 32 and 34'. In particular, a plurality of turns 118 of tape are disposed around the outer coil turns 120 and 122 of the adjacent layers of the coil sections 32 and 34', respectively, the coil turns of sections 32 and 36 having been given new reference characters in Fig. 6. Likewise, similar turns 118 of tape are disposed about the other corresponding coil turns of the adjacent layers of the coil sections 32 and 34'. These turns are effective for preventing a physical separation of the two adjacent layers of coil turns of the coil sections 32 and 34', should a high magnetic repulsive force be established therebetween. Such turns of tape are disposed intermediate each pair of the radially spaced cleat members 61.

As can be seen from the drawing, the number of turns 118 of tape disposed around the coil turns 120 and 122 of the coil sections 32 and 34', respectively, is greater in number than turns 124 of tape disposed around coil turns 126 and 128 of the next layers that appear above and below the coil turns 120 and 122, respectively. The reason for this is that the magnetic repulsive force is greater between the coil turns 120 and 122 than it is between the coil turns 126 and 128 for a given condition. Since the magnetic repulsive force is even smaller for the given condition between coil turns 130 and 132, of the following layers, a still fewer number of turns 134 of tape are disposed around the coil turns 130 and 132. The repulsive force between corresponding coil turns 136 and 138 is still smaller than the repulsive force that exists between the coil turns 130 and 132 for the given condition. Therefore, fewer turns 140 of tape are disposed around the coil turns 136 and 138 than are disposed around the coil turns 130 and 132.

Although the tape means 116 has only been described as being disposed around the corresponding coil turns 120—122, 126—128, 130—132, and 136—138, of the coil sections 32 and 34', tape is disposed in like manner, as shown in Fig. 6, around the corresponding coil turns that are disposed inwardly of the coil turns 120—122, 126—128, 130—132, and 136—138. It is to be understood, however, that the number of layers of coil turns that do not have tape disposed thereon depends on many factors, such as the rating of the reactor and the number of coil turns disposed thereon.

In order to prevent the physical separation of the coil sections 34' and 36 when a magnetic repulsive force of large magnitude exists therebetween, tape means 150 is provided which may be formed from the same material as is the tape means 116. As illustrated, the tape means 150 comprises a number of turns 152, 158, 168 and 174 of tape, associated with a predetermined number of the layers of the coil turns that comprise the coil sections 34' and 36. In particular, a plurality of turns 152 of tape are disposed around the outer coil turns 154 and 156 of the two adjacent coil turn layers of the coil sections 34' and 36. Likewise, similar turns 152 of tape are disposed about the other corresponding coil turns of the two adjacent layers of the coil sections 34' and 36. These turns of tape are effective for preventing a physical separation of the coil turns of the two adjacent layers of the coil sections 34' and 36, should a high magnetic repulsive force be established therebetween. Such turns of tape are disposed intermediate each pair of the radially spaced cleat members 61.

As can be seen from the drawing, the number of turns 152 of tape disposed around the coil turns 154 and 156 is greater in number than turns 158 of tape disposed around coil turns 160 and 162 of the next layers that appear above and below the coil turns 154 and 156, respectively. The reason for this is that the magnetic repulsive force is greater between the coil turns 154 and 156 than it is between the coil turns 160 and 162 for a given condition. Since the magnetic repulsive force is even smaller for the given condition between coil turns 164 and 166 of the following layers, a still fewer number of turns 168 of tape are disposed around the coil turns 164 and 166. The repulsive force between the corresponding coil turns 170 and 172 is still smaller than the repulsive force that exists between the coil turns 164 and 166 for the given condition. Therefore, fewer turns 174 of tape are disposed around the coil turns 170 and 172 than are disposed around the coil turns 164 and 166.

Although the tape means 150 has only been described as being disposed around the corresponding turns 154—156, 160—162, 164—166, and 170—172, of the coil sections 34' and 36, tape is disposed in like manner, around the corresponding coil turns that are disposed inwardly of the coil turns 154—156, 160—162, 164—166, and 170—172.

It is to be understood that in order to obtain complete protection for the reactor 30, whether simultaneous faults occur at the points 46 and 47 or separate faults at the points 48 or 49, as shown in Fig. 2, the tape means 70' of the Fig. 5 embodiment can be combined with the tape means 116 and 150 of the Fig. 6 embodiment. In particular, the tape means 70' of the Fig. 5 embodiment could be disposed between the vertical tape means 116 and 150, or turns of tape could be disposed around those coil turns shown in Fig. 6 that have no tape disposed thereon, the tape being applied in the same manner as in Fig. 5, so as to prevent the physical separation of the coil sections 32 and 36.

The means hereinbefore described for preventing the physical separation of the coil sections 12 and 13 of Fig. 3 when a magnetic repulsive force of large magnitude exists therebetween has several advantages. For instance, the tape means 70 does not add to the physical size of the reactor 10. In addition, the tape means 70 is so distributed among the various coil turns comprising the coil sections 12 and 13 that a minimum of tape is utilized in preventing the physical separation of the coil sections 12 and 13 when they are subjected to a high magnitude repulsive force. Corresponding advantages likewise apply to the embodiments of this invention as shown in Figures 5 and 6.

In conclusion, it is pointed out that while the illustrated examples constitute practical embodiments of my invention, I do not limit myself to the exact details shown, since the modifications of the same may be considerably varied without departing from the spirit of the invention as defined in the appended claims.

I claim as my invention:

1. In a reactor, the combination comprising, a reactor coil having a plurality of coil sections, means for normally supporting the coil sections in horizontal and vertical spaced relation so as to produce a plurality of vertically and horizontally spaced coil turns, and flexible tieing means disposed for preventing the physical separation of the coil sections when fault current flows therethrough so as to establish a high magnetic repulsive force between at least two of the coil sections, said flexible tieing means comprising a flexible tie of an insulating material disposed around two vertically spaced co-operative coil turns of two said coil sections each of which coil sections has disposed therein one of the cooperative coil turns so as to prevent the cooperative coil turns and said two coil sections from being vertically separated when a high magnetic repulsive force is established therebetween, and another flexible tie of an insulating material disposed around the two coil turns disposed above and below said cooperative coil turns so as to hold them rigidly in vertical spaced relation when fault current flows simultaneously through said two coil sections.

2. In a reactor, the combination comprising, a reactor coil comprising three coil sections, means for normally supporting the three coil sections in horizontal and vertical spaced relation so as to produce a plurality of vertically and horizontally spaced coil turns, and tape means disposed for preventing the physical separation of the outer two coil sections when fault current flows simultaneously through said outer two coil sections thus establishing a high magnetic repulsive force therebetween, said tape means comprising tape disposed around two centrally located coil turns of said two outer coil sections, the two coil turns being vertically spaced above and below one another, one of the two centrally located coil turns being disposed in one of the two outer coil sections and the other of the two centrally located coil turns being disposed in the other of the two outer coil sections, and tape disposed around the two coil turns disposed above and below the two centrally located coil turns, the tape means cooperating to hold the taped coil turns rigidly in vertical spaced relation when a high magnetic repulsive force exists therebetween.

3. In a reactor, the combination comprising, a reactor coil comprising two coil sections, means for normally supporting the coil sections in horizontal and vertical spaced relation so as to produce a plurality of vertically and horizontally spaced coil turns, and tape means for preventing the physical separation of the coil sections when fault current flows simultaneously therethrough so as to establish a high magnetic repulsive force therebetween, said tape means comprising a plurality of layers of tape disposed around two of the adjacent centrally located vertically spaced coil turns of the two coil sections so as to prevent them from being vertically separated, one of said vertically spaced coil turns being disposed in one of the coil sections and the other of said vertically spaced coil turns being disposed in the other of the two coil sections, and a fewer number of turns of tape disposed around the coil turns disposed above and below the two centrally located coil turns so as to hold them rigidly in vertical spaced relation when a high magnetic repulsive force exists therebetween.

4. In a reactor, the combination comprising, a reactor coil comprising three coil sections, means for normally supporting the three coil sections in horizontal and vertical spaced relation so as to produce a plurality of vertically and horizontally spaced coil turns, and tape means for preventing the physical separation of the outer two coil sections when fault current flows simultaneously through said outer two coil sections so as to establish a high magnetic repulsive force therebetween, said tape means comprising a plurality of layers of tape disposed around two centrally located coil turns of said outer two coil sections which are vertically spaced above and below one another, one of the two centrally located coil turns being disposed in one of the two outer coil sections and the other of the two centrally located coil turns being disposed in the other of the two outer coil sections, and a fewer number of turns of tape disposed around the two coil turns disposed above and below the two centrally located coil turns.

5. In a reactor, the combination comprising, a reactor coil comprising two coil sections, means for normally supporting the coil sections in horizontal and vertical spaced relation so as to produce a plurality of vertically and horizontally spaced coil turns, and tape means for preventing the physical separation of the coil sections when fault current flows simultaneously through both coil sections so as to establish a high magnetic repulsive force therebetween, said tape means comprising a plurality of turns of tape formed from glass fibers disposed around two adjacent centrally located vertically spaced coil turns so as to prevent them from being vertically separated when a high magnetic repulsive force exists between the coil sections, one of said vertically spaced coil turns being disposed in one of the coil sections and the other of said vertically spaced coil turns being disposed in the other of the two coil sections, and a fewer number of turns of tape formed from glass fibers disposed around the two coil turns disposed above and below the two centrally located coil turns so as to hold them rigidly in vertical spaced relation when a high magnetic repulsive force exists therebetween.

LOUIS E. SAUER.

References Cited in the file of this patent
UNITED STATES PATENTS

| Number | Name | Date |
| --- | --- | --- |
| 2,228,093 | Sauer | Jan. 7, 1941 |